US011357609B2

(12) United States Patent
Mathieu

(10) Patent No.: US 11,357,609 B2
(45) Date of Patent: Jun. 14, 2022

(54) DEVICE, METHOD, AND SYSTEM FOR RESTRAINING AN ANIMAL IN A FIXED POSITION FOR A MEDICAL PROCEDURE

(71) Applicant: THE ROYAL INSTITUTION FOR THE ADVANCEMENT OF LEARNING/MCGILL UNIVERSITY, Montréal (CA)

(72) Inventor: Axel Mathieu, Montreal (CA)

(73) Assignee: THE ROYAL INSTITUTE FOR THE ADVANCEMENT OF LEARNING/MCGILL UNIVERSITY, Montreal (CA)

(*) Notice: Subject to any disclaimer, the term of this patent is extended or adjusted under 35 U.S.C. 154(b) by 300 days.

(21) Appl. No.: 16/319,508

(22) PCT Filed: Jul. 20, 2017

(86) PCT No.: PCT/CA2017/050872
§ 371 (c)(1),
(2) Date: Jan. 22, 2019

(87) PCT Pub. No.: WO2018/014130
PCT Pub. Date: Jan. 25, 2018

(65) Prior Publication Data
US 2021/0121277 A1    Apr. 29, 2021

Related U.S. Application Data

(60) Provisional application No. 62/365,626, filed on Jul. 22, 2016.

(51) Int. Cl.
*A61D 3/00*    (2006.01)

(52) U.S. Cl.
CPC .......... *A61D 3/00* (2013.01); *A61D 2003/003* (2013.01); *A61D 2003/006* (2013.01)

(58) Field of Classification Search
CPC ...................................................... A61D 3/00
See application file for complete search history.

(56) References Cited

U.S. PATENT DOCUMENTS 3,276,433 A * 10/1966 Tougas ................. A01K 1/0613
                                                    119/722
4,549,501 A * 10/1985 Anderson ............ A01K 1/0613
                                                    119/729

(Continued)

FOREIGN PATENT DOCUMENTS

| CA | 2873345 A1 | 11/2013 |
| CN | 111772855 A * | 10/2020 |
| GB | 2209455 A | 5/1989 |

OTHER PUBLICATIONS

International Search Report and Written Opinion for PCT/CA2017/050872, dated Oct. 13, 2017.

*Primary Examiner* — Michael H Wang
(74) *Attorney, Agent, or Firm* — Norton Rose Fulbright Canada LLP

(57) ABSTRACT

A restraining device for an animal. A body having a base and two spaced-apart walls define a cavity to receive the animal. At least one pair of side restraining members is mounted to one of the walls of the body. Each restraining member is displaceable away from the wall and into the cavity to engage a side of the animal. An overhead restraining member is mounted to the body above the base. The overhead restraining member is displaceable toward and away from the base to engage the animal. A tightening mechanism is mounted to the body and has at least one rotatable rod. The first end of the rod has a rotatable handle to rotate the rod and the second end has a cam engaging one of the side restraining members. The handle rotates the cam and displaces the side restraining members into the cavity.

20 Claims, 10 Drawing Sheets

(56) References Cited

U.S. PATENT DOCUMENTS

| | | | |
|---|---|---|---|
| 5,291,857 A | 3/1994 | Braun, Jr. | |
| 6,275,723 B1* | 8/2001 | Ferris | A61B 5/055 |
| | | | 600/417 |
| 6,711,430 B1 | 3/2004 | Ferris et al. | |
| 6,778,849 B1* | 8/2004 | Ninomiya | A61B 5/055 |
| | | | 324/318 |
| 7,343,194 B2 | 3/2008 | Ferris et al. | |
| 8,028,663 B2* | 10/2011 | Chen | A01K 1/0613 |
| | | | 119/729 |
| 2001/0053878 A1 | 12/2001 | Ferris et al. | |
| 2004/0204642 A1* | 10/2004 | Ferris | A61B 5/055 |
| | | | 600/410 |
| 2008/0308047 A1* | 12/2008 | Mollhagen | A01K 1/0613 |
| | | | 119/734 |
| 2009/0000567 A1* | 1/2009 | Hadjioannou | A61B 6/0421 |
| | | | 119/755 |
| 2010/0056899 A1* | 3/2010 | Toddes | G01R 33/30 |
| | | | 600/411 |
| 2012/0278990 A1* | 11/2012 | Lanz | A61B 6/44 |
| | | | 5/601 |
| 2012/0330130 A1* | 12/2012 | Lanz | A61B 5/055 |
| | | | 600/411 |
| 2014/0100444 A1 | 4/2014 | Toddes et al. | |
| 2015/0238117 A1* | 8/2015 | Fielder | G01R 33/34046 |
| | | | 5/637 |

* cited by examiner

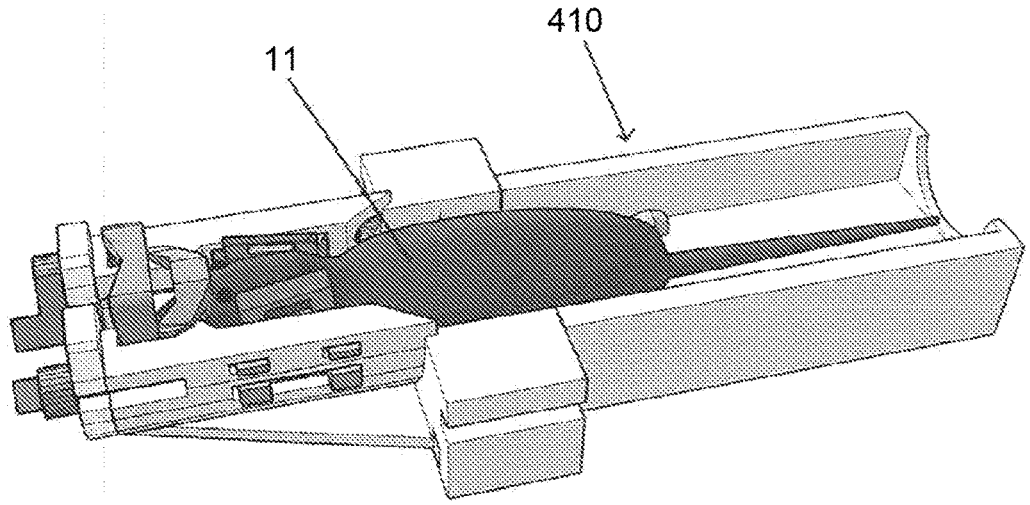
FIG.7A
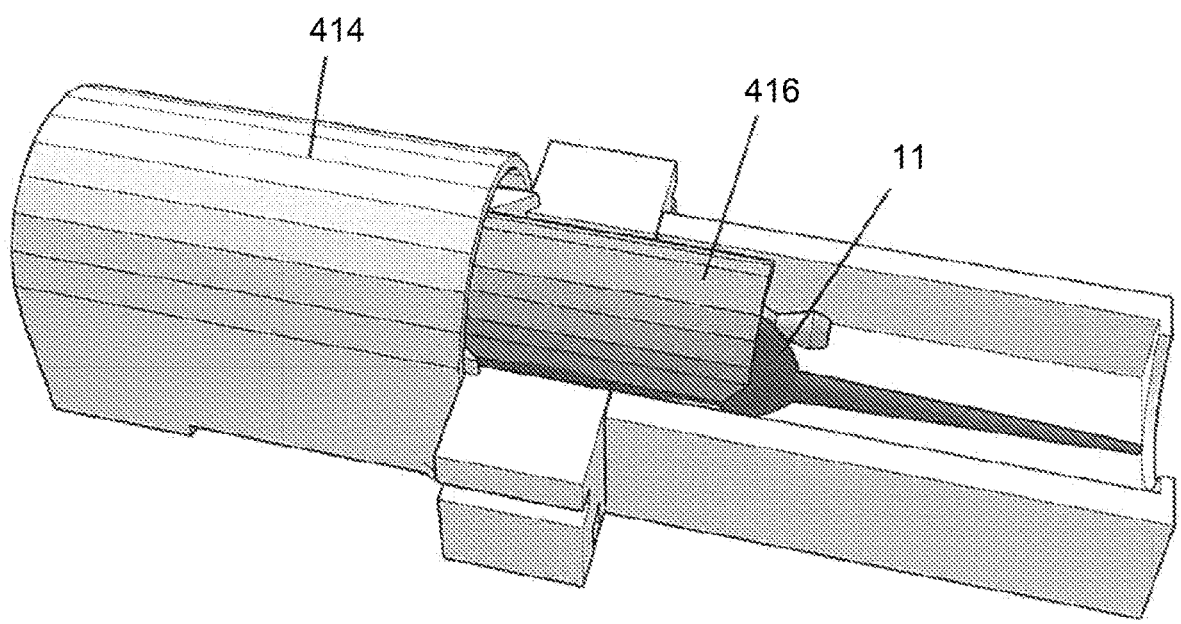
FG.7B

DEVICE, METHOD, AND SYSTEM FOR RESTRAINING AN ANIMAL IN A FIXED POSITION FOR A MEDICAL PROCEDURE

CROSS-REFERENCE TO RELATED APPLICATIONS

This application claims the priority of U.S. provisional patent application No. 62/365,626 filed Jul. 22, 2016, the entire contents of which are incorporated by reference herein.

TECHNICAL FIELD

The present disclosure relates generally to equipment for medical imaging and/or surgery, and more particularly to a restraining device for performing a medical procedure on an animal.

BACKGROUND

Prior to conducting neuroimaging studies in humans, it is important to validate experimental models and neuroimaging methods in small animals, such as mice.

Magnetic resonance imaging (MRI) is one popular neuroimaging method used to study small animals. While it is possible to conduct neuroimaging on small animals while they are anesthetized, it is known that the study of some brain functions is incompatible with anesthetized animals. It is also known that some anesthesia alter brain activity measures obtained with MRI, making direct measurement of brain activity challenging. Therefore, neuroimaging must sometimes be performed on awake (i.e. non-anesthetized) animals.

It can be difficult to accurately perform imaging on mice and other small animals that are awake, because they are difficult to keep still and become easily agitated and stressed. Stress and motion effect brain activity and can have undesirable influences on test results, and can generate unusable data due to too much movement within the images.

Conventional systems for restraining awake small animals during imaging are often too large or magnetic (thereby making them unsuitable for use in an MRI machine), uncomfortable for the animal (thereby making pain management necessary), or unnecessarily invasive (such as surgically installed head post, for example).

SUMMARY

There is therefore provided a restraining device for an animal, the restraining device comprising: a body having a base and two spaced-apart walls extending upright from the base, the base and walls defining a cavity extending along a length of the body to receive the animal therein; at least one pair of side restraining members, each restraining member of the at least one pair of side restraining members being mounted to one of the walls of the body, each restraining member being displaceable away from said wall and into the cavity to engage a side of the animal; an overhead restraining member mounted to the body above the base, the overhead restraining member being displaceable toward and away from the base to engage the animal; and a tightening mechanism mounted to the body and having at least one rotatable rod extending between a first end and a second end, the first end having a rotatable handle to rotate the rod and the second end having a cam engaging one of the side restraining members, the handle being rotatable to rotate the cam and displace the side restraining members into the cavity to restrain the animal.

Furthermore, in accordance with an embodiment, at least one rod is mounted adjacent to one of the walls of the body and extends parallel to the length of the body.

Furthermore, in accordance with an embodiment, the handle is located at a longitudinal end of the body.

Furthermore, in accordance with an embodiment, the at least one rod includes a first rod and a second rod, the first and second rods being disposed within one of the walls of the body, each of the first and second rods extending parallel to the length of the body.

Furthermore, in accordance with an embodiment, the handle has a locking mechanism to lock the handle in position.

Furthermore, in accordance with an embodiment, the locking mechanism includes at least one slot in a longitudinal end portion of the body and a tooth mounted on the handle, the handle being rotatable to rotate the tooth and position it within the slot.

Furthermore, in accordance with an embodiment, the device further comprises an animal support mountable on the base and displaceable with respect to the base along the length of the body.

Furthermore, in accordance with an embodiment, the animal support is raised from the base.

Furthermore, in accordance with an embodiment, the base further includes a ridge extending outwardly from the base along at least part of the length of the body, the ridge having an upper ridge surface being vertically spaced apart from the base.

Furthermore, in accordance with an embodiment, the base further includes at least one hole of unrestricted size at least partially the length of the body, the hole exposing or giving unlimited access to below under the base.

Furthermore, in accordance with an embodiment, the device further comprises a cover mountable to the walls of the body over the base thereof, the cover having at least one press member being displaceable toward and away from the base to engage the animal from above.

Furthermore, in accordance with an embodiment, at least one of the walls of the body has an opening therein, at least one of the side restraining members being positioned adjacent to the opening and engaging the cam therethrough.

Furthermore, in accordance with an embodiment, the at least one pair of side restraining members includes a first pair of side restraining members and a second pair of side restraining members, the side restraining members of the first and second pairs of side restraining members being spaced apart along the length of the body.

Furthermore, in accordance with an embodiment, the device further comprises an accessory mountable to a rear of the body.

Furthermore, in accordance with an embodiment, the device further comprises a bite bar extending from at least one wall of the body into the cavity.

There is also provided a method for restraining an animal in position, the method comprising: placing the animal in a cavity of a restraining device; displacing side restraining members of the restraining device into the cavity to restrain the animal from each of its sides; displacing an overhead restraining member of the restraining device into the cavity to restrain the animal from above; and preventing displacement of at least one of the side and overhead restraining members to restrain the animal within the cavity.

Furthermore, in accordance with an embodiment, displacing the side restraining members includes displacing the side restraining members from a front end of the device.

Furthermore, in accordance with an embodiment, displacing the side restraining members includes displacing the side restraining members from the back end of the device.

Furthermore, in accordance with an embodiment, displacing the side restraining members includes displacing the side restraining members simultaneously.

Furthermore, in accordance with an embodiment, displacing the side restraining members includes displacing the side restraining members independently of one another.

Furthermore, in accordance with an embodiment, preventing displacement includes locking at least one of the side and overhead restraining members in position.

Furthermore, in accordance with an embodiment, placing the animal in the cavity includes supporting the animal to raise its feet from a base of the restraining device.

Furthermore, in accordance with an embodiment, placing the animal in the cavity includes placing the animal into the cavity while the animal is awake.

Furthermore, in accordance with an embodiment, the method further comprises performing a medical procedure on the restrained animal.

There is further provided a system for restraining an animal in a fixed position for a medical imaging procedure, the system comprising: a medical imaging device having imaging equipment and an imaging cavity to receive the animal therein; and a restraining device for the animal, the restraining device comprising: a body being insertable into the imaging cavity, the body having a base and two spaced-apart walls extending upright from the base, the base and walls defining a cavity extending along a length of the body to receive the animal therein; at least one pair of side restraining members, each restraining member of the at least one pair of side restraining members being mounted to one of the walls of the body, each restraining member being displaceable away from said wall and into the cavity to engage a side of the animal; an overhead restraining member mounted to the body above the base, the overhead restraining member being displaceable toward and away from the base to engage the animal; and a tightening mechanism mounted to the body and having at least one rotatable rod extending between a first end and a second end, the first end having a rotatable handle to rotate the rod and the second end having a cam engaging one of the side restraining members, the handle being rotatable to rotate the cam and displace the side restraining members into the cavity to restrain the animal.

There is further provided a method of conducting medical imaging on an awake animal, the method comprising: placing the awake animal in a cavity of a restraining device; displacing side restraining plates of the restraining device into the cavity to restrain the awake animal from each of its sides; displacing an overhead restraining plate of the restraining device into the cavity to restrain the awake animal from above; preventing displacement of at least one of the side and overhead restraining plates; and imaging the awake animal.

BRIEF DESCRIPTION OF THE DRAWINGS

Reference will now be made to the accompanying drawings.

FIG. 7A is a perspective view of a restraining device for an animal, according to yet another embodiment of the present disclosure;

FIG. 7B is a perspective view of the restraining device of FIG. 7A, having accessories to be used therewith;

It will be noted that throughout the appended drawings, like features are identified by like reference numerals.

DETAILED DESCRIPTION

Figure 1:
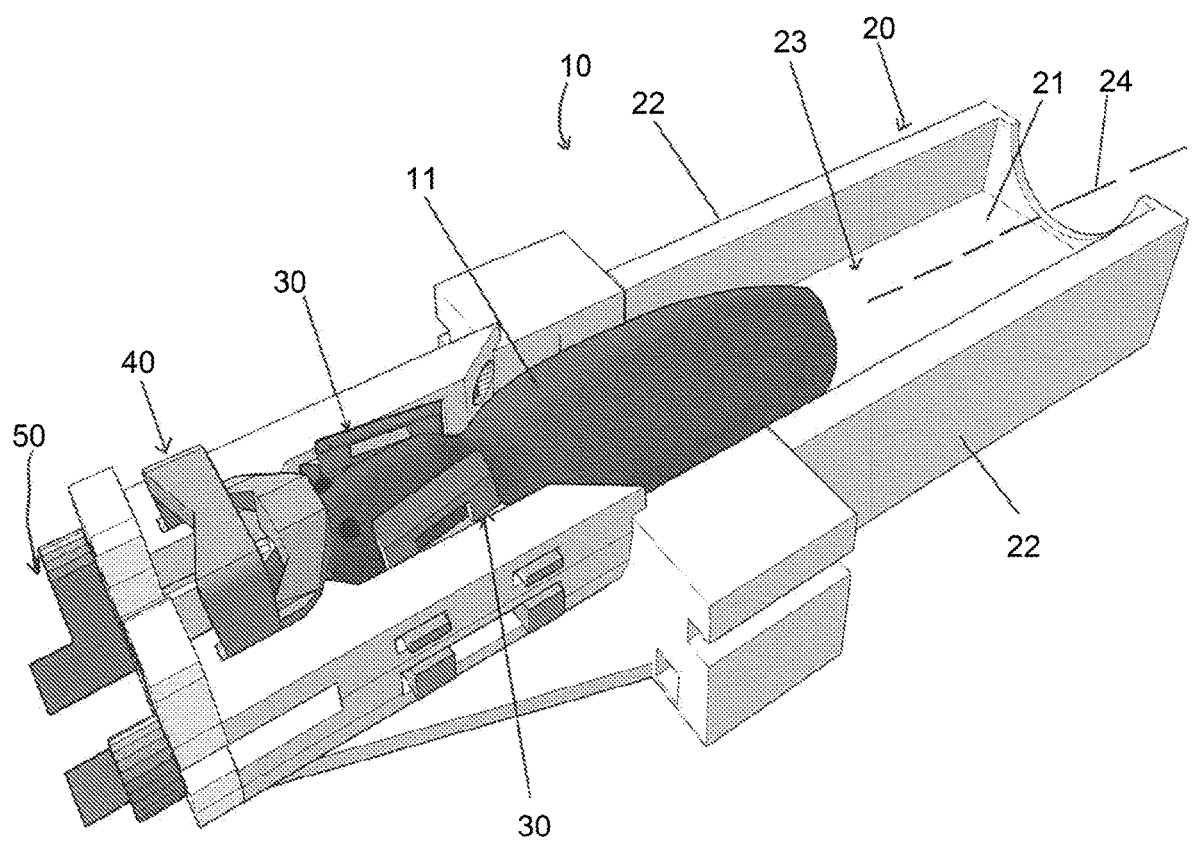
FIG. 1 is a perspective view of a restraining device for an animal, according to an embodiment of the present disclosure.

Referring to FIG. 1, there is disclosed a restraining device 10 for holding an animal 11 in a fixed position for a medical procedure. The restraining device 10 helps to constrain or eliminate the movement of some part, or all, of the animal 11 before, during and/or after the medical procedure. The restraining device 10 is used to restrain the movement of an "awake" (i.e. non-anesthetized) animal 11. The restraining device 10 can also be used to restrain and/or position an anesthetized and/or deceased animal 11. The restraining device 10 therefore helps to keep the animal 11 in a fixed position.

The restraining device 10 (occasionally referred to herein simply as "device 10") can be used to conduct any suitable medical procedure. Some non-limitative examples of medical procedures included in the present disclosure include imaging such as neuroimaging, surgical procedures, body fluid sampling, behavioral monitoring, and administration of medicinal compounds. Although shown and described herein as a being used with a mouse, the device 10 can also be used with other small animals 11 such as rats. The device 10 can also be scaled up for use with larger animals 11 such as monkeys, and human infants or adults. The device 10 can be used on its own, or combined with other accessories such that it can be adapted to conventional medical equipment, as described in greater detail below.

The device 10 has a body 20 for receiving the animal 11, side restraining members 30 which constrain movement of the animal 11 from its sides, an overhead restraining member 40 which constrains movement of the animal 11 from above, and a tightening mechanism 50 which is manipulated by a technician using the device 10 to displace the restraining members 30 toward and away from the animal 11.

Still referring to FIG. 1, the body 20 defines the corpus of the device 10 and provides structure thereto. The body 20 is an elongated object. In the depicted embodiment, the body 20 is longer than it is wide. More particularly, the body 20 has a substantially tubular shape. This particular configuration of the body 20 helps it to fit within the bore of a medical imaging device, such as a magnetic resonance imaginging (MRI) machine, allowing the device 10 to be used with existing imaging systems. The body 20 is not, however, limited to a tubular shape, and can take different forms for flat surfaces such as, but not limited to, benchtops, counters, cubicles, and shelves. In the depicted embodiment, the body 20 serves as a bed for supporting the animal 11 while it is being imaged.

The body 20 has a base 21 portion upon which the animal 11 rests, and two spaced-apart walls 22 that extend upright from the base 21. The opposed walls 22 face each other across the base 21 extend along a length. The space formed between the base 21 and the walls 22 is a cavity 23 into which the animal 11 can be placed. The cavity 23 is sized to receive the animal therein, and can thus extend along some or all of the length of the body 20 and have a longitudinal center line 24. For example, in the depicted embodiment, the cavity 23 is sized and shaped to receive a mouse. The cavity 23 can take other shapes and be of a different size than the depicted embodiment so as to receive other animals. In the depicted embodiment, the body 20 does not have an upper or top wall, such that the cavity 23 is an open-top cavity 23. The body 20 having an open-top cavity 23 facilitates the loading of the animal 11 into the body 20, and its removal therefrom. In an alternate embodiment described in greater detail below, the body 20 has a top wall or cover that encloses the cavity 23. Such a closed-top body 20 provides additional restraint for the animal 11.

Figure 2A:
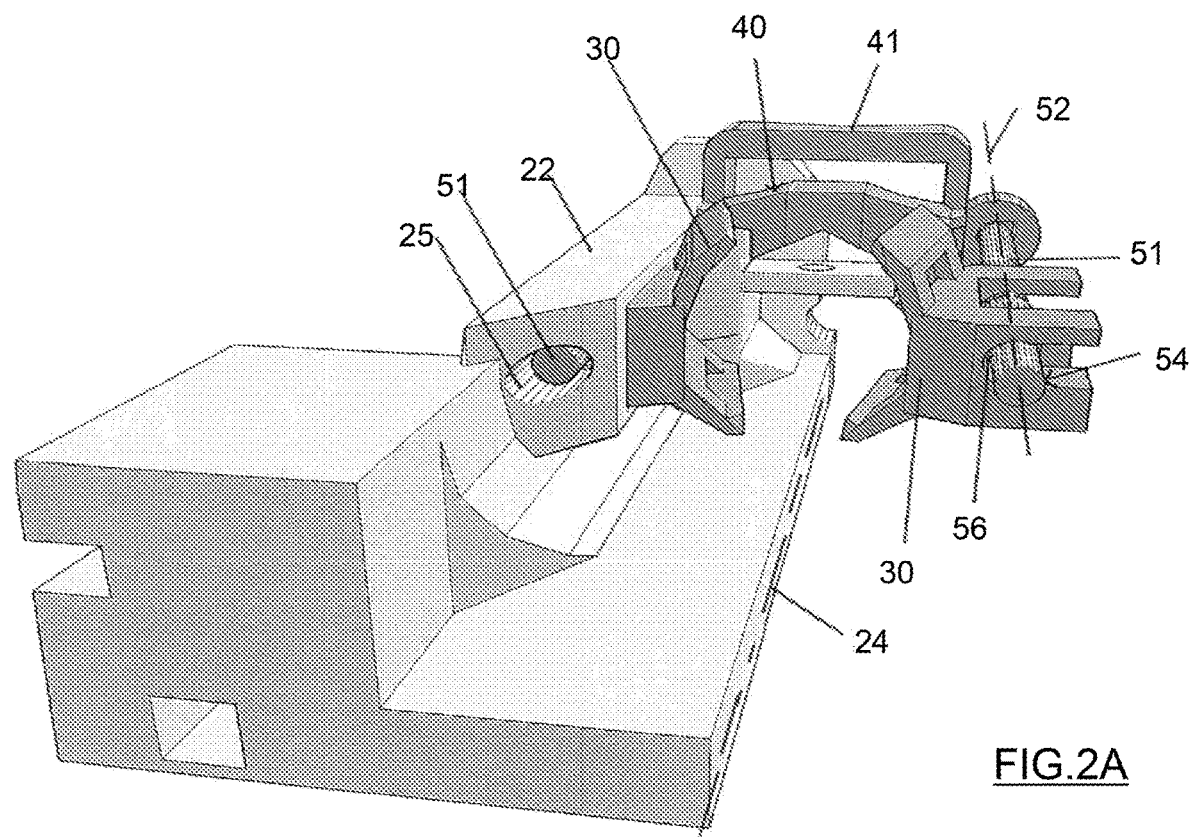
FIG. 2A is a partially sectioned view of the restraining device of FIG. 1.
Figure 2B:
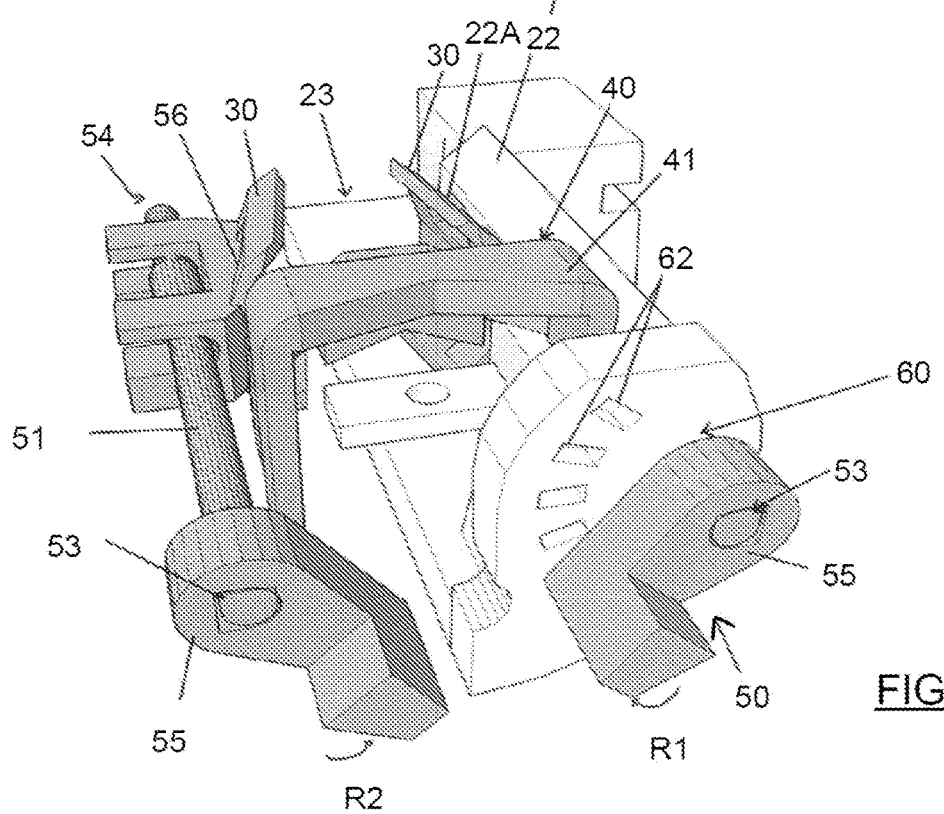
FIG. 2B is another partially sectioned view of the restraining device of FIG. 1.

FIGS. 2A and 2B show the side restraining members 30 in greater detail. Each side restraining member 30 is displaceable, and is shaped and positioned to engage the animal substantially along its sides so as to prevent it from moving laterally within the cavity 23. In the depicted embodiment, the side restraining members 30 are plates shaped and positioned to engage the head of the animal (see FIG. 1). There can be any suitable number of side restraining members 30 for accomplishing this functionality. In the depicted embodiment, there is one pair of side restraining members 30. In an alternate embodiment described in greater detail below, there are two or more pairs of side restraining members 30. Although shown as a relatively thin piece of material, each side restraining member 30 can take other forms provided that it can comfortably engage the animal to restrain its movement within the cavity 23. Examples of other suitable forms include blocs, straps, strips, and string.

In the depicted embodiment, each side restraining member 30 has a substantially concave inner surface 31. This curved or angled inner surface 31 approximates a rough side profile of the animal against which the inner surface 31 with abut, thereby improving the comfort of the animal during the medical procedure. It will be appreciated that the inner surface 31 (i.e. the surface of the side restraining member 30 which abuts directly against the animal) can take other shapes as required. Together with the tightening mechanism 50, the side restraining members 30 form a lever mechanism which helps the technician to manually and quickly restrain the movement of the animal.

Each side restraining member 30 is disposed opposite to, and facing, its corresponding side restraining member 30 of the pair. More particularly, each side restraining member 30 is disposed adjacent to a corresponding wall 22 of the body 20. The cooperation between each side restraining member 30 and the wall 22 in its vicinity can vary. For example, in the depicted embodiment, each wall 22 has an opening 22A therein which is covered by one of the side restraining members 30. As will be described in greater detail below, a rear portion of the side restraining member 30 engages with a component of the tightening mechanism 50 via the opening 22A in the wall 22. Each of the side restraining members 30 is displaceable away from its corresponding wall 22 and into the cavity 23 to engage the animal. Once the side restraining members 30 have engaged the animal by abutting against its sides, for example, the side restraining members 30 constrain lateral or sideways movement of the animal within the cavity 23. If the animal is awake, and as explained in greater detail below, the side restraining members 30 can be locked in position. In their default position (i.e. when the animal is not in the cavity 23), the side restraining members 23 can be biased toward the walls 22. In an alternative default position, the side restraining members 23 can be manually displaced with little effort by the technician to widen the cavity 23.

The movement of the side restraining members 30 into and out of the cavity 23 can take different forms. For example, the movement of the side restraining members 30 into and out of the cavity 23 can be coordinated, such that the movement of one side restraining member 30 into/out of the cavity 23 is matched by the movement of the other, opposite side restraining member 30 into/out of the cavity 23. The two opposing side restraining members 30 are therefore simultaneously moved into position together. This coordinated movement of the side restraining members 30 helps to position the animal within the cavity 23. More particularly, this coordinated movement of the side restraining members 30 facilitates the positioning and restraint of the animal along the longitudinal center line 24 of the cavity 23. In this coordinated configuration, the distance of one of the side restraining members 30 from the longitudinal center line 24 at any given moment is the same as the distance of the other side restraining member 30 from the longitudinal center line 24. This coordinated movement of the side restraining members 30 can be facilitated by mechanically linking the side restraining members 30 together through the body 20, such that movement of one of the side restraining members 30 causes an equal but opposite movement of the other side restraining member 30.

Alternatively, and as shown in the depicted embodiment and described in greater detail below, the movement of each of the side restraining members 30 can be controlled separately. This fine control of the movement of each side restraining member 30 facilitates the positioning of the animal within the cavity 23, for example, off the longitudinal center line 24. This individual and independent control of the side restraining members 30 can also allow the technician to apply more pressure, and thus more restraint, to a particular side of the animal.

Still referring to FIGS. 2A and 2B, the overhead restraining member 40 constrains movement of the animal 11 from above. The overhead restraining member 40 is mounted to the body 20 above the base 21. The overhead restraining member 40 is thus engaged to the body 20, which allows the animal 11 to be secured before loading the animal into the medical imaging device or before performing the medical procedure. Stated differently, the overhead restraining member 40 helps to restrain the movement of the animal 11 from above irrespective of the medical procedure being performed.

The distance between the overhead restraining member 40 and the base 21 forms an opening into which a part of the animal can be inserted in order to restrain its vertical movement. The overhead restraining member 40 is therefore operable to engage any upper part of the animal 11 including, but not limited to, its nose, its head, and its back. The overhead restraining member 40 is displaceable relative to the body 20, and more particularly, vertically displaceable. The overhead restraining member 40 therefore acts as a vertically-displaceable upper restraining member or object. In the embodiment where the movement of the head of the animal is restrained (see FIG. 1), the overhead restraining member 40 is positioned forward of the side restraining members 30 and acts as a nose press which presses down on the nose of the animal to prevent it from raising or lowering its head. The overhead restraining member 40 can also be used to suppress or restrain vertical movement of another part of the animal. The overhead restraining member 40 can also be locked in position, which may be useful if the medical procedure is performed while the animal is awake. The overhead restraining member 40 in the depicted embodiment is a clamp which is locked into place with a locking wedge 41 having the same vertical movement as the overhead restraining member 40. The locking wedge 41 for the overhead restraining member 40 can take different forms and directions of movement provided it restrains the vertical movement of overhead restraining member 40. Examples of other suitable mechanisms include, but are not limited to, tape, string, and screws. The overhead restraining member 40 and/or wedge 41 can include a suitable handle which helps the technician to displace and/or lock the overhead restraining member 40 in position.

The tightening mechanism 50 is manually operated by the technician to displace the side restraining members 30 toward, and optionally away from, the animal to thereby restrain the animal. The tightening mechanism 50 therefore allows the technician to quickly and easily restrain the animal to the extent required. The tightening mechanism 50 has one or more rotatable rods 51 which each rotate about a rod axis 52 and are mounted to the body 20. In the depicted embodiment, the tightening mechanism 50 has two rods 51, each of which is engaged with a corresponding side restraining member 30, and which are housed within elongated slots 25 in the body 20. In an alternative embodiment where the movement of the side restraining members 30 is coordinated, only one rod 51 is required to displace both side restraining members 30 via a suitable mechanical linkage.

Still referring to FIGS. 2A and 2B, each rod 51 extends a length between a first end 53 and an opposed second end 54. Each rod 51 is mounted adjacent to the walls 22 of the body 20. More particularly, each rod 51 is mounted within one of the wall 22 and extends in a direction that is parallel to the length of the body 20, and parallel to the longitudinal center axis 24. The position of the rods 51 along the walls 22 of the body 20 maintains a narrow, "streamlined" body 20 which can thus more easily fit within the narrow bore of an imaging machine, for example.

The first end 53 of the rod 51 has a rotatable handle 55 which is manipulated by the technician to rotate the rod 51. In the depicted embodiment, the handle 55 attached to the first end 53 of each rod 51 is positioned at a forward or front end of the body 20. The position of the handle 55 at the forward or front end of the body 20 maintains a narrow, "streamlined" body 20 which can thus more easily fit within the narrow bore of an imaging machine, for example. By being positioned at the forward or front end of the body 20, the handle 55 is more easily accessed when it is inside an imaging machine than if the handle 55 were on the side of the body 20. This configuration of the handles 55 contrasts with that of some conventional restraining systems, which employ a perpendicular mechanism near the head of the body and thus do not fit within the narrow bore of an MRI machine.

The second end 54 of each rod 51 has a cam 56 attached or integral with the second end 54, and engaging one of the side restraining members 30. The cam 56 is any projection or protrusion from the second end 54 that is rotatable about the rod axis 52. In the depicted embodiment, each cam 56 makes sliding contact with a rear surface of one of the side restraining members 30 via the opening 22A in the wall 22 to displace the side restraining member 30 into the cavity 23. The cam 56 can thus be any object which transforms the rotational input from the handles 55 into a translational displacement of the side restraining members 30, and is not limited to the depicted configuration. Similarly, the cam 56 may be positioned elsewhere along the rod 51, and is not limited to being located at a distal extremity of the rod 51. Furthermore, the cam 56 may be affixed to a corresponding one of the side restraining members 30.

Each handle 55, and thus each rod 51, is rotatable. When the technician rotates each handle 55 in one direction R1,R2, each cam 56 is rotated and engages the corresponding side restraining member 30 to displace it into the cavity 23 to restrain the animal. Rotation of each handle 55 in this direction R1,R2 therefore leads to restraining the movement of the animal. To remove the animal from within the cavity 23, it may not be required to rotate the handle 55 again. The side restraining members 30 can simply be manually displaced by the technician to access the animal within the cavity. Alternatively, in the embodiment where each cam 56 is fixedly attached to a corresponding side restraining member 30, rotation of each handle 55 in a direction opposite to the direction R1,R2 will cause the side restraining members 30 to displace toward the walls 22 and thus allow access to the animal. It can be appreciated that the engaging rotation for the side restraining members 30 can also be in opposite directions as in the depicted embodiment and/or can both rotate in the same direction provided that the motion results in the engagement of the side restraining members 30 to restrain animal movement.

In the embodiment depicted in FIGS. 2A and 2B, the device 10 has a locking mechanism 60 to lock the side restraining members 30 in position when restraining the animal. The locking mechanism 60 may be used with awake animals, and may not be used when the device 10 is used to restrain anesthetized or deceased animals. The locking mechanism 60 can take any suitable configuration to achieve such functionality. For example, in one embodiment, the locking mechanism 60 is integrated into each handle 55 and has a ratchet allowing rotation of the handle 55 (and thus the cam 56) in the direction R1,R2, while restricting rotation of the handle in an opposite direction with a releasable pawl. In the depicted embodiment, the locking mechanism 60 has a tooth 61 attached to each handle 55 which can be rotated to fit into any one of a number of slots 62 in a forward face of the body 20. With such a locking mechanism 60, the technician can rotate each handle 55 in direction R1,R2 to displace the side restraining members 30 into the cavity 23. When the animal is suitably restrained, the technician can insert the tooth 61 of each handle 55 into the desired slot 62. This will prevent further rotation of the handle 55, thereby preventing the corresponding side restraining member 30 from being displaced further. The movement of the awake animal is now restrained in at least the lateral direction.

In the depicted embodiment, the device 10 also has a bite bar 70 which extends from one or more of the walls 22 of the body 20 and into the cavity 23. The bite bar 70 is positioned and sized for the animal to bite onto it. In the depicted embodiment, the bite bar 70 is positioned forward of the side restraining members 30 and helps to properly position the head of the animal for imaging, for example. The bite bar 70 may also assist in calming the animal before and/or during the medical procedure. The bite bar 70 may not be used when the device 10 is used to restrain anesthetized or deceased animals.

The device 10 may be used as follows. In order to restrain an animal in the cavity 23, the animal is first placed into the cavity 23 and encouraged to bite onto the bite bar 70. The technician then rotates the handles 55 to rotate the cams 56 and displace the side restraining members 30 into the cavity 23 until they abut against the animal and apply enough pressure to restrain its movements. The locking mechanism 60 can then be used to prevent further displacement of the side restraining members 30. The overhead restraining member 40 can then be pressed down via its wedge 41 onto the nose of the animal, for example, and locked in position so as to prevent vertical and lateral head movements. The medical procedure (imaging, surgery, administering medical compounds, etc.) can then be performed on the restrained and properly positioned animal.

It can thus be appreciated that the lockable side restraining members 30, along with the integrated bite bar 70 and a lockable overhead restraining member 40 holding the awake animal's head in a specific location, and successfully stop animal head movements, even when the animal is trying to free itself and has not previously been exposed to the device 10. The movement restriction achieved is often sufficient for good quality image acquisitions.

Figure 3A:
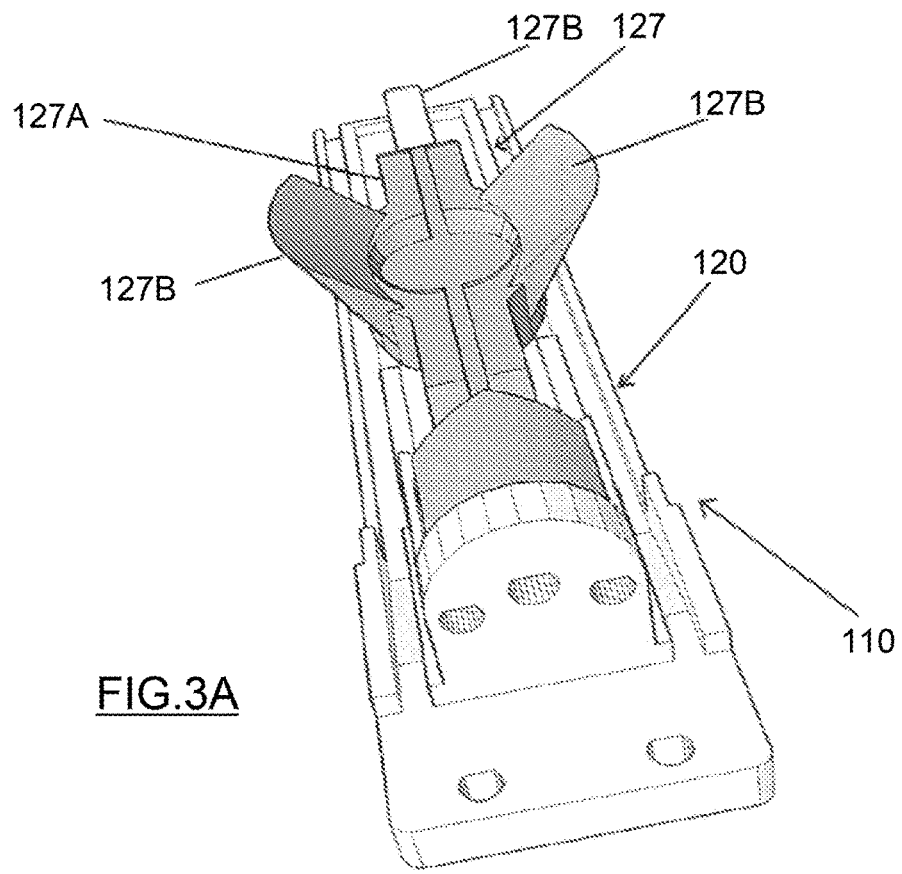
FIG. 3A is a perspective view of a restraining device for an animal, according to yet another embodiment of the present disclosure.
Figure 3B:
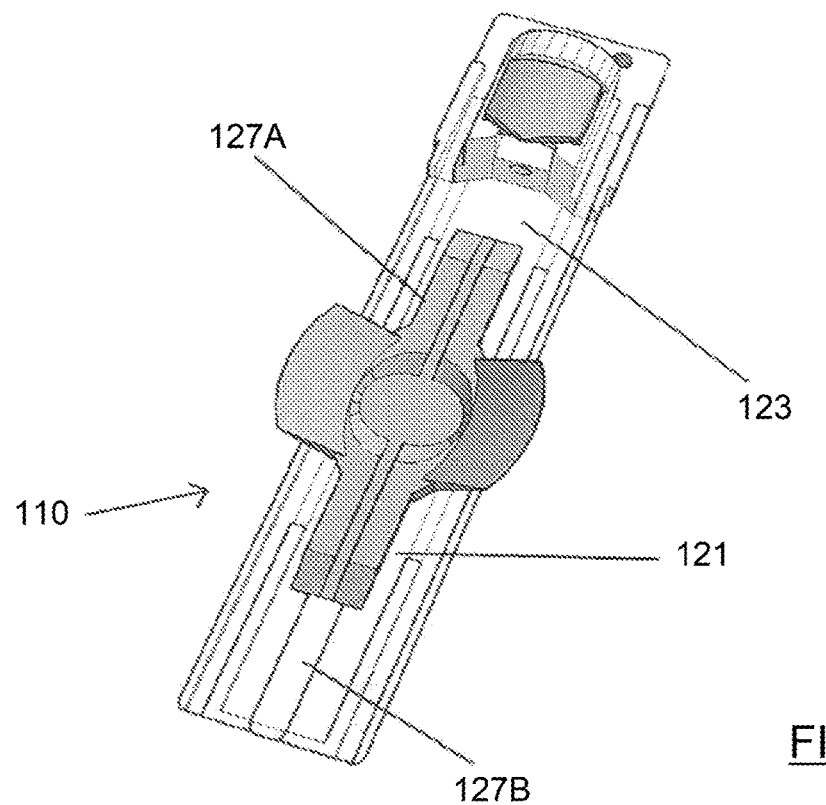
FIG. 3B is a perspective view of the restraining device of FIG. 3A.

FIGS. 3A and 3B show another embodiment of the device 110. The device 110 has a displaceable animal support 127 for supporting the animal 11 and loading it into the cavity 123 of the device 110. The animal support 127 includes a platform 127A mounted to the base 121 of the body 120. The animal 11 is placed in the platform 127A. The platform 127A includes side wings 127B which engage opposed sides of the animal 11 to further restrain it. The side wings 127B are curved bodies. The base 121 in the depicted embodiment includes a rail 127B on which the platform 127A is mounted. The platform 127A is displaceable along the rail 127B in a direction that is parallel to the length of the body 120 and to the longitudinal center axis 24. The animal support 127 therefore allows an animal 11 to be loaded thereon away from the body 120 and then displaced into the body 120. The platform 127A is spaced above the surface of the base 121 by the rail 127B. The animal 11 is therefore raised from the base 121 when it is supported by the platform 127A. The animal support 127 therefore facilitates raising the body of the animal 11 from the base 121 such that the feet are positioned comfortably on the platform 127A.

Figure 4A:
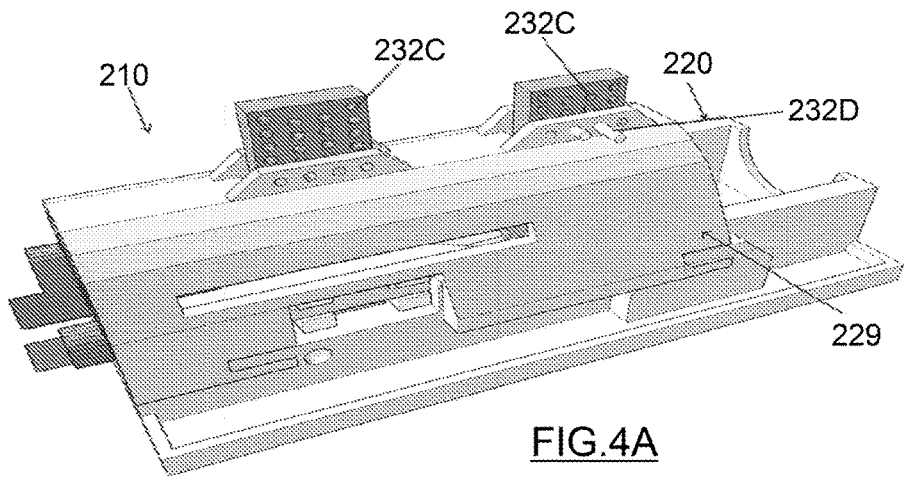
FIG. 4A is a perspective view of a restraining device for an animal, according to yet another embodiment of the present disclosure.
Figure 4B:
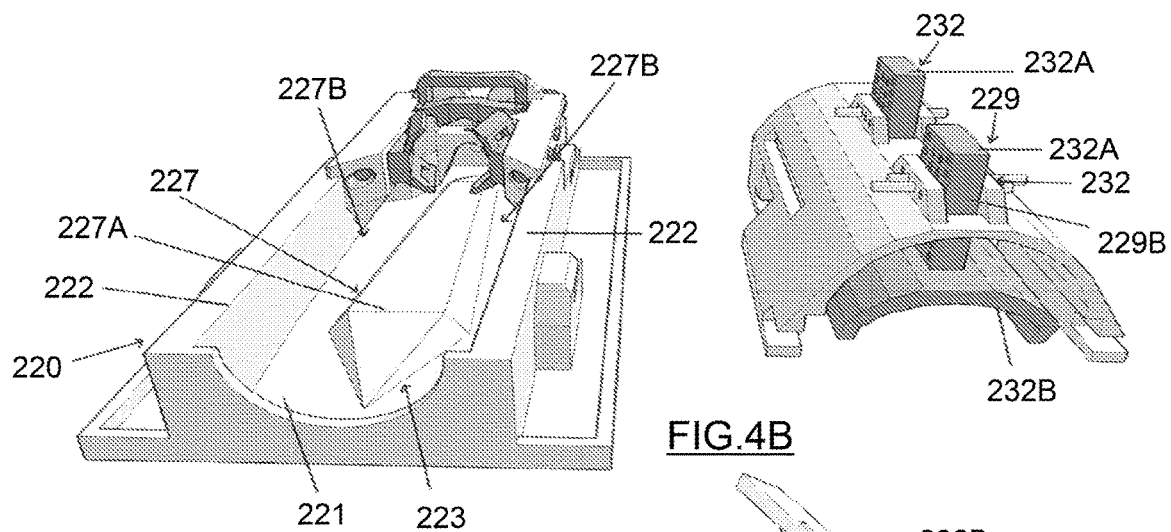
FIG. 4B is a perspective view of the restraining device of FIG. 4A being dissembled.
Figure 4C:
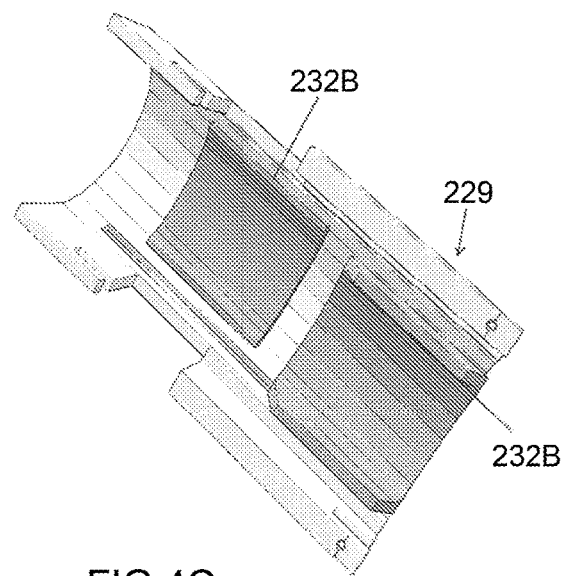
FIG. 4C is a perspective view of a cover of the restraining device of FIG. 4A.

FIGS. 4A to 4C show another embodiment of the device 210. Referring to FIG. 4B, the base 221 has a comfort ridge 227 or projection that extends outwardly from the surface of the base 221 along at least part of the length of the body 220. The ridge 227 has an upper ridge surface 227A that is vertically spaced apart from the remaining surface of the base 221. The ridge 227 is therefore a raised bump. The animal 11 is therefore spaced from the surface of the base 221 when the underside of the animal 11 is resting on the upper ridge surface 227A. Leg slots 227B are provided on either side of the ridge 227 between the ridge 227 and one of the walls 222 of the body 220. Each leg slot 227B extends along a length of the body 220 to accommodate the legs and feet of the animal 11 when it is supported by the ridge 227. The ridge 227 and leg slots 227B facilitate raising the feet of the animal 11 from the base 221 such that the feet dangle in the leg slots 227B and thus float above the base 221.

Referring to FIGS. 4A to 4C, the restraining device 210 has a cover 229 to enclose the cavity 223 from above and form a "closed-top" device 210. The cover 229 provides additional restraint to the animal 11 when it is within the device 210. The cover 229 is mounted to, and removed from, the walls 222 of the body 220 over the base 221, as shown in FIG. 4A. Referring to FIGS. 4B and 4D, the cover 229 has one or more press members 232 which are displaceable toward and away from the base 221 to engage the animal 11 from above. In the depicted embodiment, each of the press members 232 includes a handle 232A attached to a press plate 232B. The handles 232A each extend through a separate opening 229B in the cover 229. The user is able to manipulate the handles 232A to push the press plates 232B downward to restrain the animal 11 within the cover 229, and to raise the press plates 232B to free the animal 11. The press members 232 therefore provide additional options for restraining the animal 11 from above.

Referring further to FIGS. 4A and 4B, one or more press members 232 has a locking mechanism to restrain the motion of the one or more press members 232 towards or away the base 221 so as to restrain animal motion. In the depicted embodiment, the displaceable motion of the one or more of the handles 232A towards or away the base is accomplished by at least one perpendicular hole 232C with respect to the displaceable motion towards or away from the base 221 within the press member handle 232A and a locking pin 232D placed within the perpendicular hole 232C.

The locking pin 232D for restraining the displaceable motion the handle 232A can take different forms provided it restrains the displaceable movement towards or away from the base 221. Examples of other suitable mechanisms include, but are not limited to, tape, string, and screws and may not require the perpendicular hole 232B.

Figure 5A:
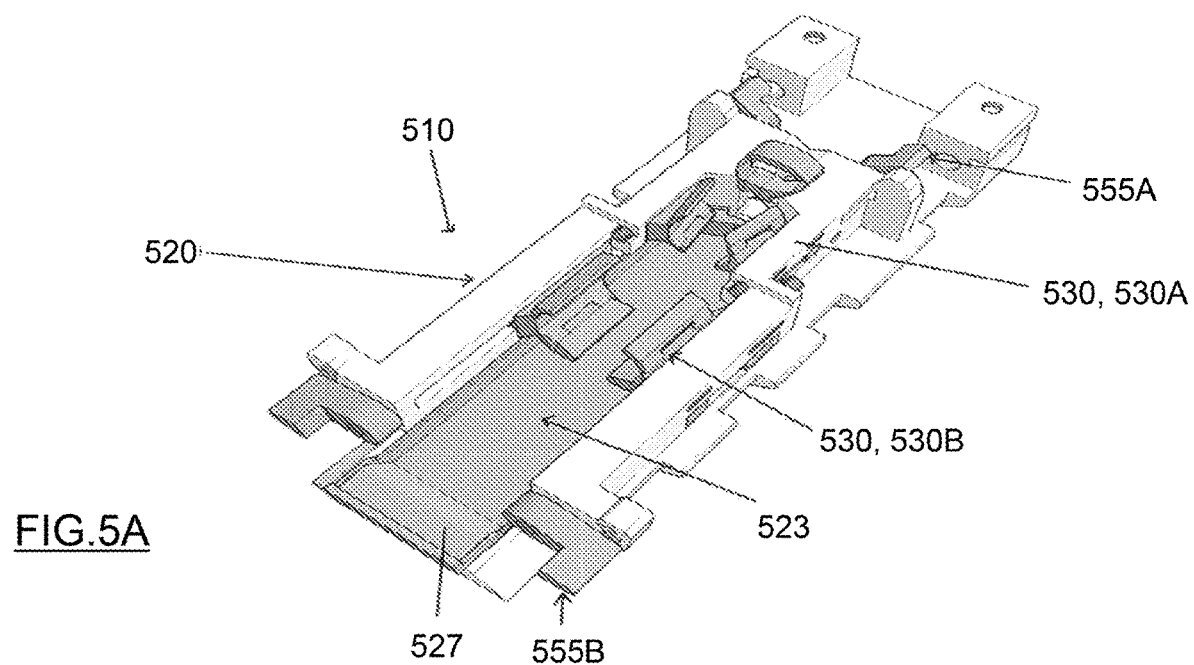
FIG. 5A is a perspective view of a restraining device for an animal, according to yet another embodiment of the present disclosure.
Figure 5B:
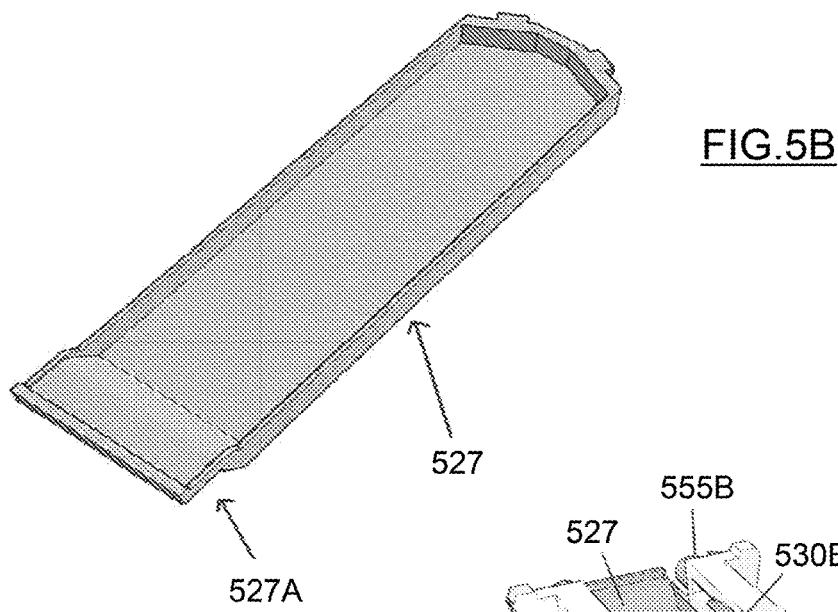
FIG. 5B is a perspective view of a bed for the restraining device of FIG. 5A.
Figure 5C:
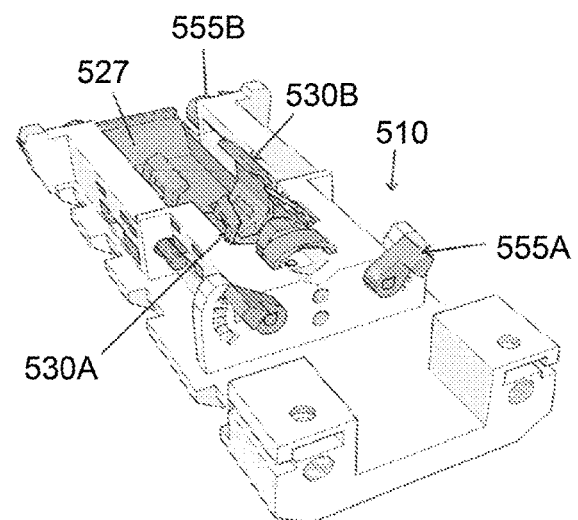
FIG. 5C is another perspective view of the restraining device of FIG. 5A.

FIGS. 5A to 5C show another embodiment of the device 510. The device 510 has two pairs of side restraining members 530. A first pair of the side restraining members 530A is spaced apart from a second pair of side restraining members 530B along the length of the body 520. The first and second pairs 530A,530B are therefore operable to restrain the lateral motion of different parts of the animal 11, such as the head and body of the animal 11. The side restraining members 530 of the first pair 530A are displaceable into the cavity 523 of the body 520 with a first pair of handles 555A. The side restraining members 530 of the second pair 530B are displaceable into the cavity 523 of the body 520 with a second pair of handles 555B. The device 510 also includes a bed 527 for supporting the animal 11 thereon. The bed 527 can be inserted into the cavity 523 to rest on the base 521. The bed 527 has a rear end 527A which is raised from a remainder of the bed 527. The raised rear end 527A provides space for a technician to insert their finger into the space underneath the rear end 527A to better manipulate the bed 527.

Figure 6:
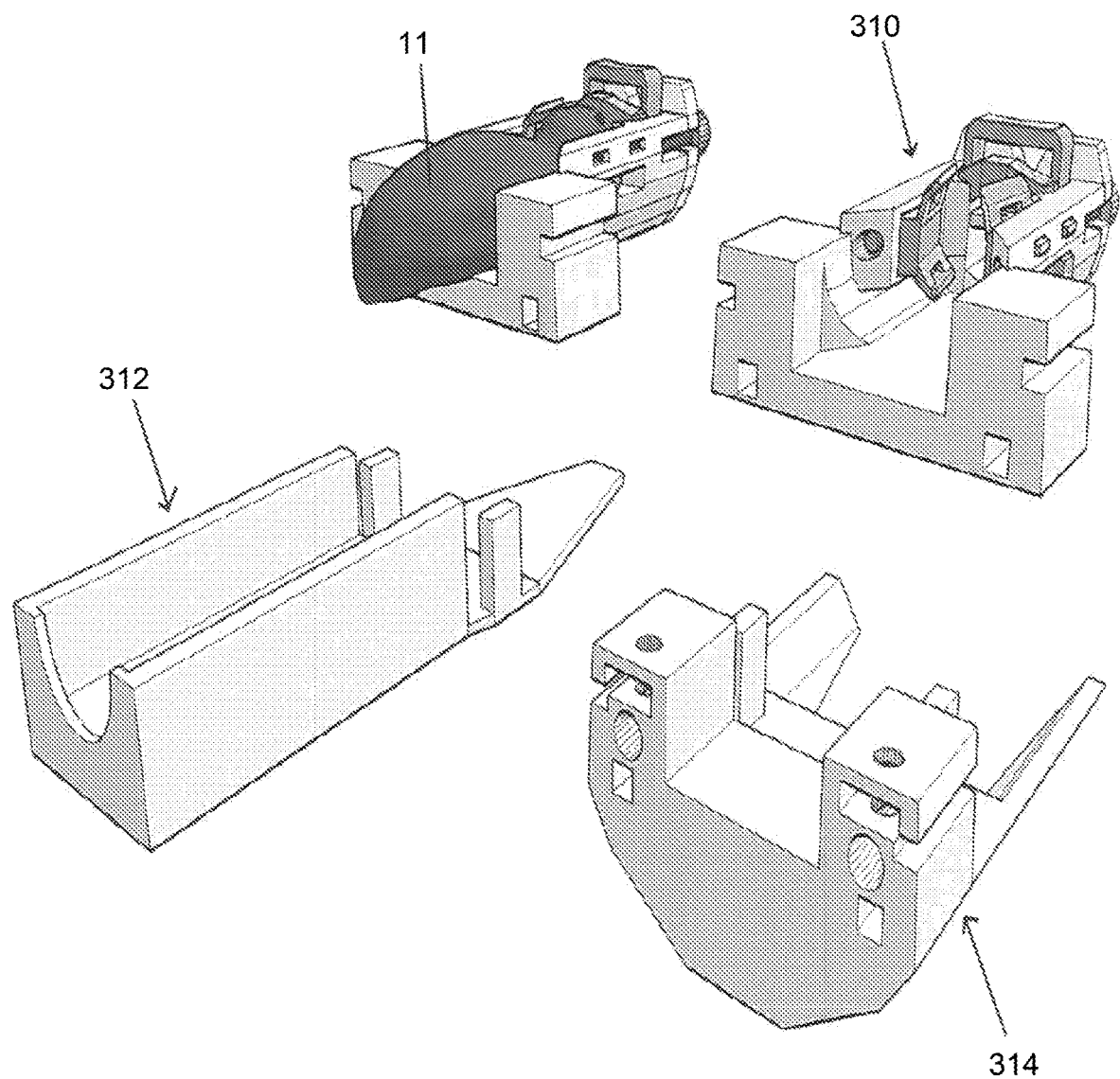
FIG. 6 is another perspective view of the restraining device of FIG. 1 and accessories to be used therewith, according to yet another embodiment of the present disclosure.

FIG. 6 shows another embodiment of the device 310 having accessories to be used therewith. One of the accessories is a benchtop bed 312 which can be quickly attached to the device 310 to work with the animal 11 on a benchtop, for training purposes or medical procedures and monitoring. Another one of the accessories is an MRI arm/bed adaptor 314 which can be quickly attached to the device 110 and fitted to a commercially-available and existing arm/bed system within the imaging bore of the MRI machine. These accessories allow for rapid animal loading into the bore of the MRI machine using the currently available arm/bed systems distributed with the MRI. These accessories can also be used with modular accessories for benchtop applications.

FIGS. 7A and 7B show another embodiment of the device 410. In FIG. 7A, the awake animal 11 is shown with its head restrained in the device 410. In FIG. 7B, a coil accessory 414 for imaging is added over the restrained animal 11 for training or transportation. An additional body restraint 416 is provided for padding for better animal compliance and comfort. The additional body restraint 416 can take other shapes and be made of other materials provided it reduces the animal's body movement by limiting the available space for the animal 11 to move. Examples of other suitable body restraints include, but are not limited to, tape, string, and covers or cushions made of soft padding, plastics, and/or gel.

Figure 8:
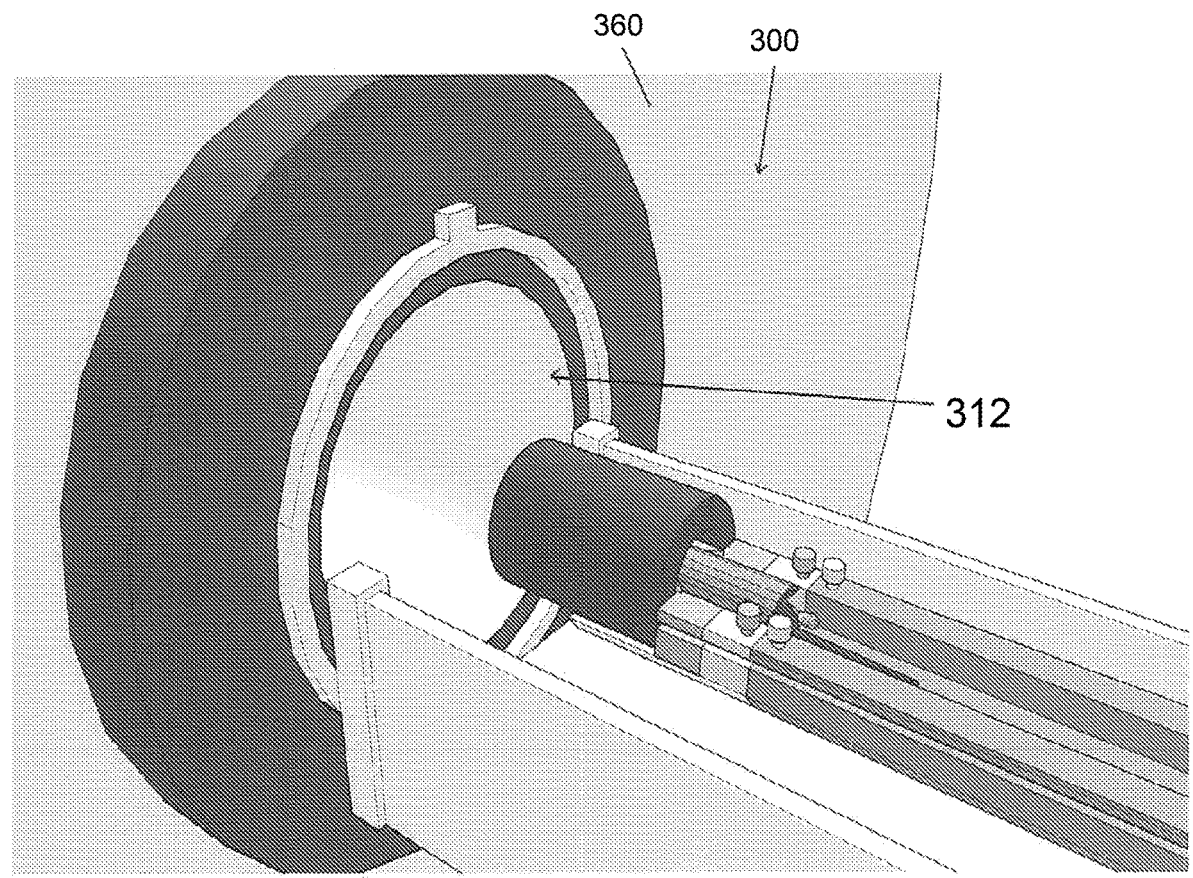
FIG. 8 is a perspective view of a system for restraining an animal in a fixed position for a medical imaging procedure, according to yet another embodiment of the present disclosure.

FIG. 8 shows a system 300 for restraining an animal 11 in a fixed position for a medical imaging procedure. The system 300 has medical imaging device 360 with imaging equipment, in this embodiment an animal MRI machine. The imaging equipment has an imaging cavity 312, the bore of the MRI machine in this embodiment, to receive the animal 11 therein. The system 300 also has a restraining device 10,110,210, 310,410,510 such as any of the ones described above. The system 300 also an MRI arm/bed adaptor attached and fitted to a commercially-available and existing arm/bed system.

Figure 9A:
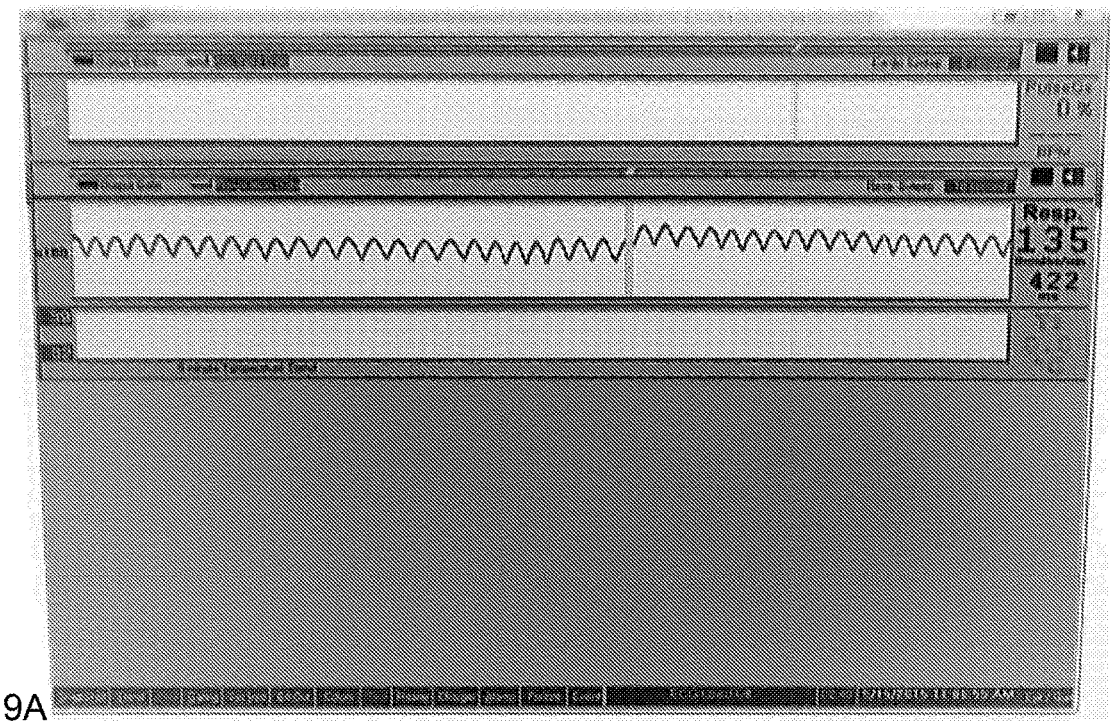
FIG. 9A is a chart showing a respiration rate of an awake mouse within a restraining device.
Figure 9B:
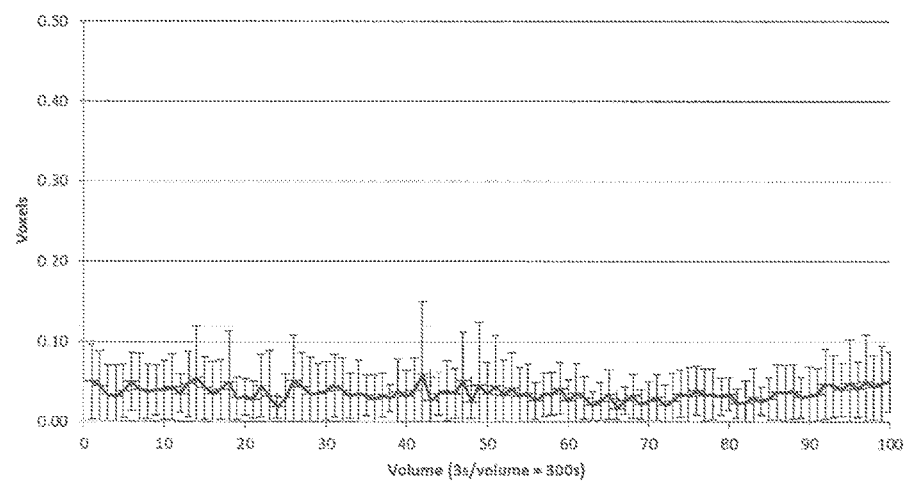
FIGS. 9B-9D are charts showing movements of an animal within axes of a restraining device.
Figure 9C:
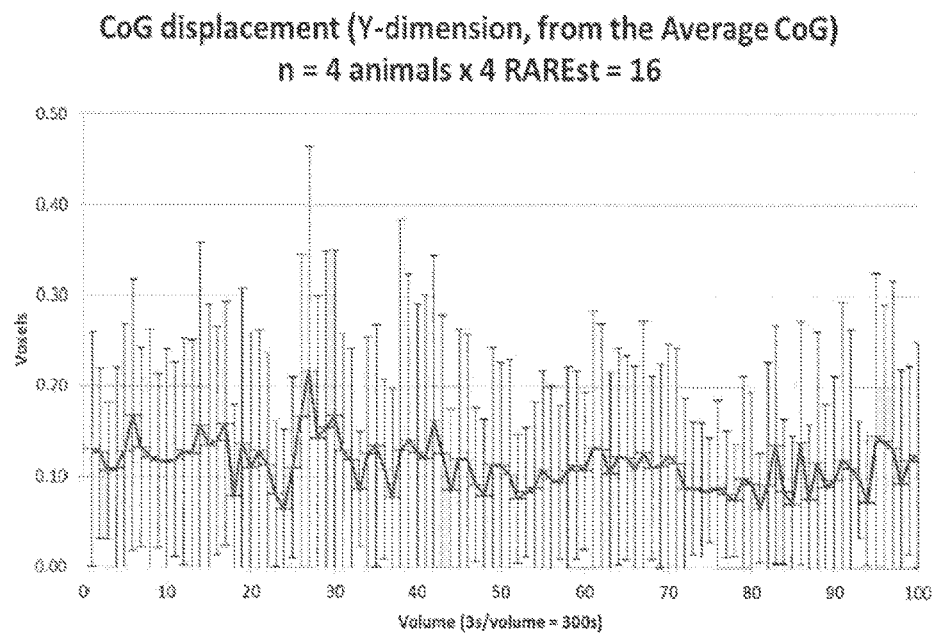
Figure 9D:
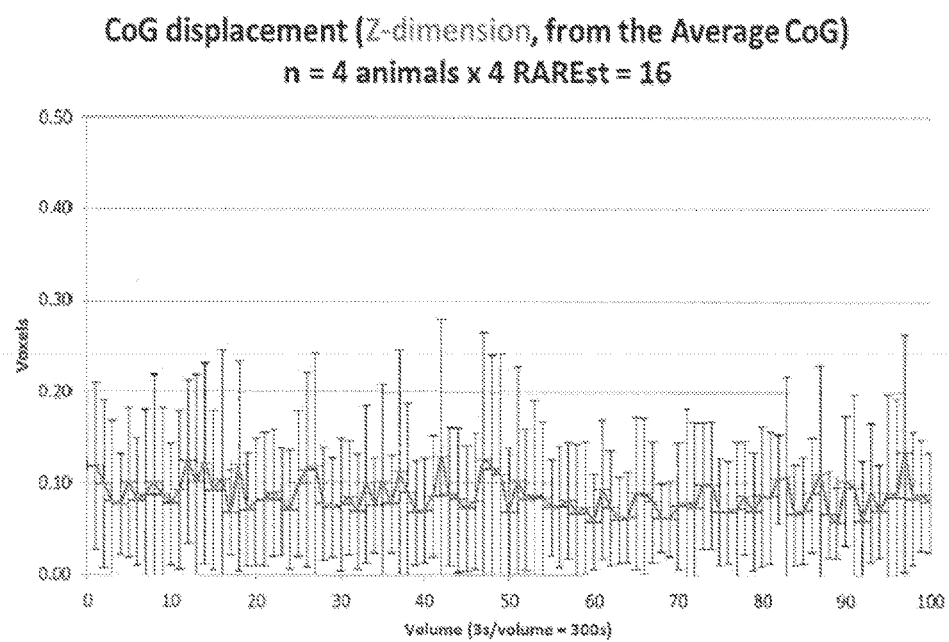

FIGS. 9A to 9D are charts showing that the awake animal breathing during scanning is stable. This may be indicative of animal compliance with the device 10,110,210, 310,410, 510, and was obtained in this instance without training the animal with the device 10,110,210,310,410,510 before measuring breathing. In FIG. 9A, the typical respiration rate of an awake untrained mouse within the restraining device 10,110,210,310,410,510 is shown while scanning under high field MRI scanning. The window shows 20 seconds of a stable respiration rhythm of 135 breaths/min. Breathing rhythms can be as low as 20 breaths/min under deep anesthesia and well over 200 breaths/min for an awake stressed animal. FIGS. 9B to 9D show movement of the animal in different axes. Movement within an image is evaluated by locating the center of gravity (CoG) essentially identifying the center of the image content. Results are in voxel coordinates reported relative to voxel size (Y-axis) in any direction as shown in the title of each graph, versus time (X-axis, images taken at every 3 seconds for 5 minutes). Most of the movement is in the Y-direction representing Up-Down struggling (see FIG. 9C) by the animal while scanning. However, the movement is broadly acceptable for analysis in that movement never moves outside of its voxel and does not shift the data unexpectedly. FIGS. 9A to 9D therefore support the device 10,110,210,310,410,510 achieving animal compliance even without prior training, and that movement during imaging can be within acceptable ranges.

The device 10,110,210,310,410,510 and its components can be made of any suitable material. More particularly, the device 10,110,210,310,410,510 can be made of any material suitable for medical imaging.

In light of the preceding, it can be appreciated that the device 10,110,210,310,410,510 disclosed herein facilitates holding an awake (i.e. non-anesthetized) animal in a fixed position for the purposes of conducting medical procedure, such as neuroimaging with MRI scans, on the animal.

The device 10,110,210,310,410,510 is also compatible with various instruments on the market, and can be fitted to various MRI instruments, CT scans, or other small bore imaging instruments. This contrasts with some conventional restraining systems, which are purpose built to be used with specific instruments. The device 10,110,210,310,410,510 can thus be used during any imaging modality where a restrictive bore space is available, such as, but not limited, to PET, SPECT, CT, and microscopy. Also, given the restrictive nature of a conventional MRI bore, the device 10,110, 210,310,410,510 can easily be expanded to larger animals and additional desktop applications.

The device 10,110,210,310,410,510 also offers ease of manipulation for the technician because the handles 55 and overhead restraining member 40 for restraining the head are easily to use, particularly when compared with some conventional systems using screws.

Referring to FIGS. 2A and 2B, there is also disclosed a method for restraining the animal 11 in position. The method includes placing the animal 11 in the cavity 23 of the restraining device 10. The method includes displacing side restraining members 30 of the restraining device 10 into the cavity 23 to restrain the animal 11 from each of its sides. The method includes displacing an overhead restraining member 40 of the restraining device 10 into the cavity 23 to restrain the animal 11 from above. The method also includes preventing displacement of at least one of the side and overhead restraining members 30,40 to restrain the animal 11 within the cavity 23.

While the invention has been described with particular reference to the illustrated embodiment, it will be understood that numerous modifications thereto will appear to those skilled in the art. Accordingly, the above description and accompanying drawings should be taken as illustrative of the invention and not in a limiting sense.

The above description is meant to be exemplary only, and one skilled in the art will recognize that changes may be made to the embodiments described without departing from the scope of the invention disclosed. Still other modifications which fall within the scope of the present invention will be apparent to those skilled in the art, in light of a review of this disclosure, and such modifications are intended to fall within the appended claims.

The invention claimed is:

1. A restraining device for an animal, the restraining device comprising:
 a body having a base and two spaced-apart walls extending upright from the base, the base and walls defining a cavity extending along a length of the body to receive the animal therein;
 at least one pair of side restraining members, each side restraining member of the at least one pair of side restraining members being mounted to one of the walls of the body, each side restraining member being displaceable away from said wall and into the cavity to engage a side of the animal;

an overhead restraining member mounted to the body above the base, the overhead restraining member being displaceable toward and away from the base to engage the animal; and a tightening mechanism mounted to the body and having at least one rotatable rod extending between a first end and a second end, the first end having a rotatable handle to rotate the rod and the second end having a cam engaging one or more of the at least one pair of side restraining members, the handle being rotatable to rotate the cam and displace the at least one pair of side restraining members into the cavity to restrain the animal.

2. The restraining device as defined in claim 1, wherein the at least one rod is mounted adjacent to one of the walls of the body and extends parallel to the length of the body.

3. The restraining device as defined in claim 2, wherein the handle is located at a longitudinal end of the body.

4. The restraining device of claim 1, wherein the at least one rod includes a first rod and a second rod, each of the first and second rods being disposed within one of the walls of the body, each of the first and second rods extending parallel to the length of the body.

5. The restraining device as defined in claim 1, wherein the handle has a locking mechanism to lock the handle in position.

6. The restraining device as defined in claim 5, wherein the locking mechanism includes at least one slot in a longitudinal end portion of the body and a tooth mounted on the handle, the handle being rotatable to rotate the tooth and position it within the slot.

7. The restraining device as defined in claim 1, further comprising an animal support mountable on the base and displaceable with respect to the base along the length of the body.

8. The restraining device as defined in claim 7, wherein the animal support is raised from the base.

9. The restraining device as defined in claim 1, wherein the base further includes a ridge extending outwardly from the base along at least part of the length of the body, the ridge having an upper ridge surface being vertically spaced apart from the base.

10. The restraining device as defined in claim 1, wherein the base further includes at least one hole in the base.

11. The restraining device as defined in claim 1, further comprising a cover mountable to the walls of the body over the base thereof, the cover having at least one press member being displaceable toward and away from the base to engage the animal from above.

12. The restraining device as defined in claim 1, wherein at least one of the walls of the body has an opening therein, at least one side restraining member of the at least one pair of side restraining members being positioned adjacent to the opening and engaging the cam therethrough.

13. The restraining device as defined in claim 1, wherein the at least one pair of side restraining members includes a first pair of side restraining members and a second pair of side restraining members, the side restraining members of the first and second pairs of side restraining members being spaced apart along the length of the body.

14. A system for restraining an animal in a fixed position for a medical imaging procedure, the system comprising:

a medical imaging device having imaging equipment and an imaging cavity to receive the animal therein; and a restraining device for the animal, the restraining device comprising:

a body being insertable into the imaging cavity, the body having a base and two spaced-apart walls extending upright from the base, the base and walls defining a cavity extending along a length of the body to receive the animal therein;

at least one pair of side restraining members, each side restraining member of the at least one pair of side restraining members being mounted to one of the walls of the body, each side restraining member being displaceable away from said wall and into the cavity to engage a side of the animal;

an overhead restraining member mounted to the body above the base, the overhead restraining member being displaceable toward and away from the base to engage the animal; and a tightening mechanism mounted to the body and having at least one rotatable rod extending between a first end and a second end, the first end having a rotatable handle to rotate the rod and the rod engaging the at least one pair of side restraining members, the handle being rotatable to rotate the rod and displace the at least one pair of side restraining members into the cavity to restrain the animal.

15. A restraining device for an animal, the restraining device comprising:

a body having a base and two spaced-apart walls extending upright from the base, the base and walls defining a cavity to receive the animal therein;

at least one pair of side restraining members, each side restraining member of the at least one pair of side restraining members being displaceable away from one of walls and into the cavity to engage a side of the animal;

an overhead restraining member mounted to the body above the base, the overhead restraining member being displaceable toward and away from the base to engage the animal; and a tightening mechanism mounted to the body and having at least one rod extending between a first end and a second end and rotatable about a rod axis, part of the at least one rod engaging the at least one pair of side restraining members, rotation of the at least one rod about the rod axis displacing the at least one pair of side restraining members into the cavity to restrain the animal.

16. The restraining device as defined in claim 15, wherein rotation of the at least one rod displaces the at least one pair of side restraining members in a direction perpendicular to, and away from, one of the walls.

17. The restraining device as defined in claim 15, wherein the at least one pair of side restraining members are displaceable away from one of walls and into the cavity to abut against the side of the animal.

18. The restraining device as defined in claim 15, wherein the at least one pair of side restraining members are displaceable away from one of the walls and into the cavity to abut against the side of a head of the animal.

19. The restraining device as defined in claim 15, comprising a locking mechanism engaged with the at least one rod and configured to prevent rotation of the at least one rod about the rod axis.

20. The restraining device as defined in claim 15, wherein the overhead restraining members is displaceable toward and away from the base in a linear vertical direction.

* * * * *